US006979189B2

(12) United States Patent
Baxter et al.

(10) Patent No.: US 6,979,189 B2
(45) Date of Patent: Dec. 27, 2005

(54) APPARATUS AND METHOD FOR ADJUSTING COMPONENT FEATURES

(76) Inventors: Rex Baxter, 106 Ridgeway Dr., Excelsior Springs, MO (US) 64024; Ade Adebo, 15008 Linden La., Shawee Mission, KS (US) 66224

(*) Notice: Subject to any disclaimer, the term of this patent is extended or adjusted under 35 U.S.C. 154(b) by 236 days.

(21) Appl. No.: 10/621,162

(22) Filed: Jul. 16, 2003

(65) Prior Publication Data

US 2005/0012232 A1 Jan. 20, 2005

(51) Int. Cl.[7] .............................................. B29C 47/16
(52) U.S. Cl. ...................... 425/325; 425/380; 425/383; 425/466
(58) Field of Search ................................ 425/466, 325, 425/380, 296, 383, 392, 12, DIG. 16

(56) References Cited

U.S. PATENT DOCUMENTS 1,854,788 A * 4/1932 Fenati ........................ 425/325
3,796,532 A * 3/1974 Needleman .................. 425/325
5,837,297 A * 11/1998 Yada et al. .................. 425/381

* cited by examiner

Primary Examiner—Joseph S. Del Sole
(74) Attorney, Agent, or Firm—Lathrop & Gage,L.C.

(57) ABSTRACT

An apparatus and method to adjust the dimensions of thermoplastic components following passage of the component through final processing in a fixture. The invention particularly relates to an apparatus for maintaining product tolerances on thermoplastic components that have undergone post-form extrusion. In addition, the invention relates to a method for maintaining product tolerances on post-form extruded thermoplastic materials.

4 Claims, 3 Drawing Sheets

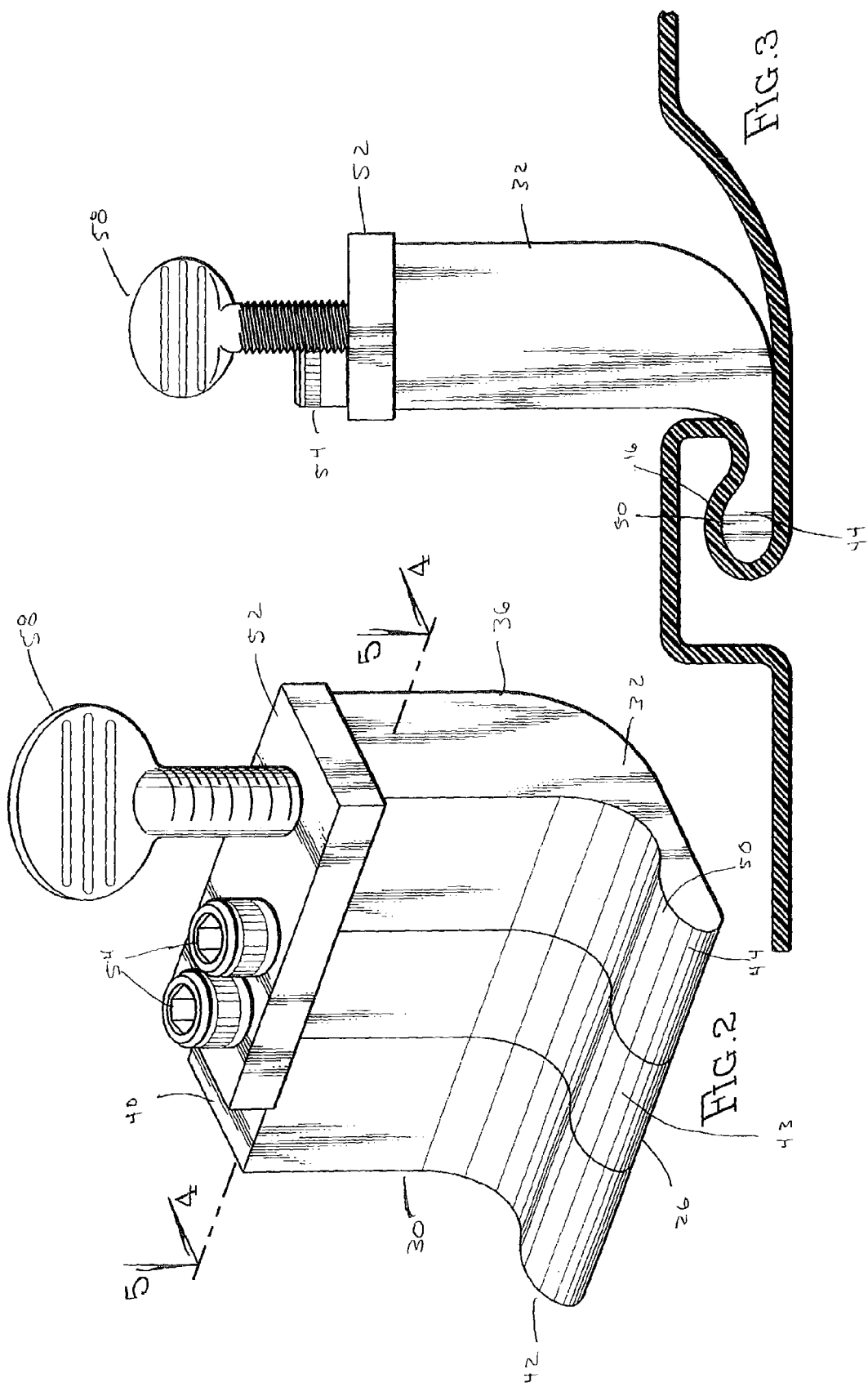

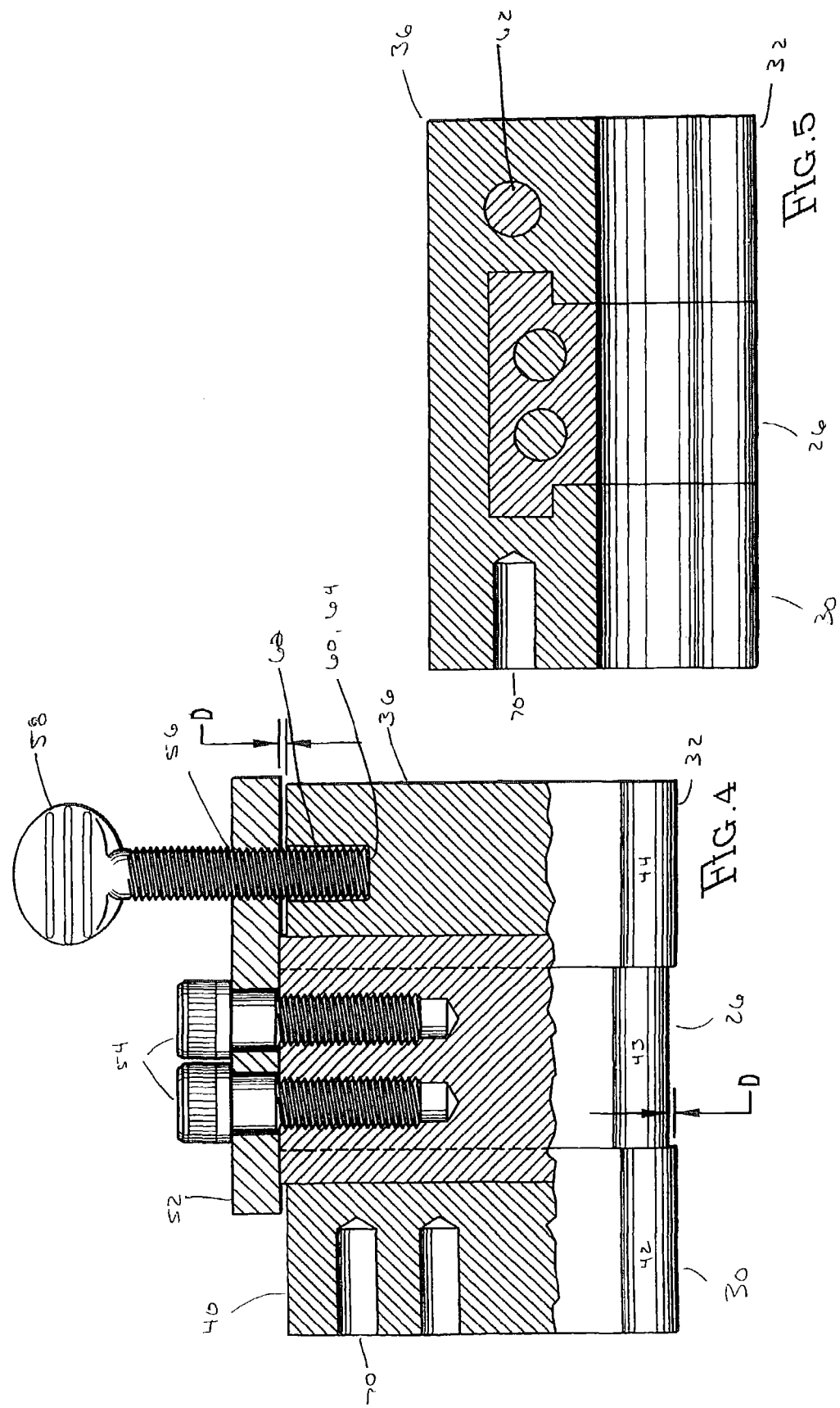

APPARATUS AND METHOD FOR ADJUSTING COMPONENT FEATURES

FIELD OF THE INVENTION

The present invention generally relates to an apparatus and method to adjust the dimensions of thermoplastic components following passage of the component through final processing in a fixture. The invention particularly relates to an apparatus for maintaining tolerances on thermoplastic components that are post-form extruded. In addition, the invention relates to a process for maintaining product tolerances for post-form extruded thermoplastic materials.

BACKGROUND OF THE INVENTION

Numerous products in the market today are extruded thermoplastics. Such products include vinyl siding, picture frames, tubing, rain gutters and down spouts to name just a few. Thermoplastics such as polyvinyl chloride offer significant advantages in the market place because of their ease of use in forming the product, the finished product's durability and capacity to handle extremes of temperature as well as the ability to color and texturize the product to suit consumer demands. For purposes of example only, the issue of dimensional quality control will be discussed in the context of post-form extruding thermoplastics into a wide variety of vinyl siding styles, textures and colors. Dimensional quality control utilizing the method and apparatus described herein can be applied to a wide variety of products.

Products such as vinyl siding must be manufactured to exacting tolerances in order to withstand the extremes of temperature found in many regions of the country and throughout the world. In addition, the siding must be resistant to moisture, be able to resist damaging impacts from hail, rocks and other objects launched by lawnmowers and even balls and toys thrown by children. Vinyl siding that does not meet design specifications can be poor fitting and consequently aesthetically unappealing thereby leading to product recalls and significant consumer dissatisfaction. Vinyl siding with features that do not mate well because the siding fails to meet design specifications will result in a product that can be very difficult for the installer to attach to the building, or attach to the building without an unsightly fit.

Two commonly employed techniques for producing vinyl siding are profile extrusion and post-form extrusion. Profile extrusion utilizes an extrusion machine to heat powdered thermoplastic resin, typically poly-vinyl chloride, and under great pressure, forces it out of a die in the desired cross-section profile. Though very effective at producing high quality products with dimensional stability, it is a relatively slow process with feed rates in the range of 1.5 to 6 meters per minute (5 to 15 feet per minute). As with nearly all production lines, the speed of production is critical in order for the business to be profitable.

The technique that is most commonly employed for production of vinyl siding is post-form extrusion. With post-form extrusion, thermoplastic resin is heated to temperatures around 200° C. and forced under pressures of as much as 13.8 Kilopascals (2000 pounds per square inch) from an extrusion device. The extruded thermoplastic is then formed into a flat sheet and may undergo other processes such as embossing or cooling before being fed into a water cooled fixture that is commonly referred to as a calibrator. The calibrator serves to bend and twist the flat sheet into the desired profile as the flat sheet is pulled through the calibrator by the haul-off machine at the end of the production line.

The fixtures used to form the flat sheet into the final cross section are machined to very exacting tolerances with internal surfaces that are ground to a mirror finish and are typically plumbed with communicating passages for application of a vacuum source to pull the moving flat sheet against the upper surfaces of the calibrator. Pulling the sheet against the upper surface of the calibrator facilitates increased processing speed by reducing the prospect for jamming and binding of the thermoplastic material against the bottom surface of the calibrator as it moves at speeds of up to 50 meters per minute (165 feet per minute).

As the flat sheet moves into the calibrator it is shaped and formed into the desired cross section. Increasing demand for vinyl siding has prompted manufacturers to seek ways to economically increase their productivity. One way to increase productivity is to increase the haul off machine rate thereby increasing the rate at which resin must be fed into the extruder. Increasing the haul-off rate can have the unintended consequence of changing the dimension of the finished product. Different production lines utilizing nearly identical calibrators can also have different tensions placed on the sheet being pulled through the production equipment. Likewise, varying extrusion device temperature ranges and even varying resin mixtures particularly when coupled with different pull rates can have subtle, yet palpable, impacts on the dimensional integrity of the vinyl siding features.

Accordingly, a substantial need exists for a methodology that can be utilized to adjust the dimensions of features of the post-form extruded vinyl siding after the siding exits the calibrator and before the thermoplastic has had an opportunity to fully set in its final form. A further need exists for a low cost and functional apparatus that can simply and efficiently be utilized to adjust the dimensions of critical features of a post-form extruded product, such as vinyl siding after it exits the calibrator.

SUMMARY OF THE INVENTION

This invention pertains to an apparatus and a method for using the apparatus to adjust to product specifications the dimensions of post-form extruded vinyl siding after the product has exited the calibrator fixture. This invention is not limited to vinyl siding applications and can be utilized on any thermoplastic component that is post-form extruded. This summary will be limited to discussion of vinyl siding applications in order to clearly illustrate the functionality of the apparatus and method of the present invention.

Thermoplastic products have become increasingly popular due to the ease of forming the thermoplastic resin into a finished product, the product's durability and the ability to produce the products in a variety of textures and colors. As previously noted, this invention pertains to an apparatus and method that can be employed in any setting that utilizes thermoplastics in a post-form extrusion process. The numerous attributes of thermoplastic materials have contributed to the substantial increase in the market share that vinyl siding, has experienced over other home siding products during the past several years. Maintaining the finished product within design specification tolerances is critical and requires a concerted effort on the part of the engineer designing and building the fixture/calibrator as well as the process engineer who oversees the vinyl siding production line. Failure to maintain product quality through dimensional control can have catastrophic effects on market success based solely on the ease or difficulty of product installation in the field. If the installers of the vinyl siding find the product difficult to install because of poor design or the inability to maintain product within tolerances, they will seek to install another vendor's product.

Post-form extrusion of vinyl siding generally begins with the introduction of a thermoplastic resin, generally polyvinyl chloride, into an extruder. The extruder augers the resin into contact with the barrel of the extruder generating heat and transitioning the powdered resin to a viscous fluid with considerable resistance to flow. Heater bands strapped to the barrel of the extruder raise the temperature of the resin to approximately 176° C. (350° F.). The highly viscous extruded thermoplastic is then fed into a flat sheet die where it is compressed into a planar sheet and maintains the temperature at which it exited the extruder. Following the flat sheet die which produces a typical cross sectional dimension of from 0.76 mm to 1.5 mm (0.03 to 0.06 inches) in thickness the thermoplastic sheet is pulled through the embossing rolls for imprinting of the grain texture upon the surface of the vinyl siding panels. After passing between the embossing rolls the thermoplastic is pulled through a set of cooling rolls that lowers the temperature to around 115° C. (240° F.). From the cooling rolls the thermoplastic sheet enters the calibrator, or water fixture, which imparts the final desired cross section to the panel.

The calibrator is a precision machined fixture with ultra smooth mirror finish internal surfaces for easing the thermoplastic resin through the many folds and bends encountered within the fixture. In addition to the ultra-smooth surfaces, the calibrator incorporates a series of communicating channels for connection to a vacuum source at surface ports on the calibrator. The communicating channels also open at inlets to the mirror finish surfaces. The vacuum inlets assist in pulling the flat sheet material toward the outer geometry of the calibrator through a reduction in air pressure thereby reducing the prospect for jamming or clogging of the polyvinyl chloride in the calibrator.

Even though the fixtures are precision machined to within a few thousandths of an inch, the thickness of key features on the post-form extruded panel can change from one run to the next, or even during the same run, depending upon the rate at which the product is pulled through the calibrator, the temperatures that are maintained on the ancillary equipment such as the flat sheet die and even the specific mixture of resin that is employed. These parameters all conspire to alter the final dimension of product features exiting the calibrator.

We have found that to maintain the dimensions that are specified for the vinyl siding, particularly on the panel's critical locking feature, a post-form adjustment mechanism is extremely beneficial. Accordingly, the present invention is directed to an apparatus for attachment to the calibrator and for further adjusting, as necessary, the dimension of specified features of the vinyl siding as the profiled feature exits the calibrator.

The apparatus is comprised of a member precisely mounted to the fixture, generally with dowel pins. The member is further comprised of an outer member with a first and a second leg, and an inner member, the inner member slidably mounted between the first leg and the second leg of the outer member. The inner and outer members are comprised of an upper surface and a shaping means opposed the upper surface for altering the dimensions of the panel extruded from the calibrator. The inner member further includes a plate overhanging at least one of the outer members and is detachably secured to the upper surface of the inner member with screws or other suitable attachment means.

Extending outwardly individually from each inner and outer member is a finger. The fingers are machined to coincide with a specific feature, or portion of a feature, of the vinyl siding panel such that any change in the position of any of the fingers will result in a change in the configuration or dimension of the vinyl panel as it is passes from the calibrator.

With the outer members rigidly attached to the calibrator, the inner member can be slidably adjusted up or down through the use of a screw or other adjustment mechanism that is threaded through the plate overhanging the outer member. The screw, or other adjustment mechanism, contacts the upper surface of the rigidly secured outer member and urges the inner member to move either up or down through the translation of force across the overhanging plate which is detachably secured to the inner member. As the thumbscrew or other adjustment mechanism is rotated the protruding finger opposite the upper surface moves up or down and interferes with the profile of the not yet fully set thermoplastic crossing its surface. If, for example, the finger of the inner member protrudes into the locking feature of the extruded vinyl panel, the finger can be utilized to open or close the gap that exists in the locking feature potentially saving the production run of panel from being scrapped if the locking feature dimensions do not fall within product tolerances.

Accordingly, a substantial need exists for a methodology that can be utilized to adjust the dimensions of features of the post-form extruded vinyl siding after the siding exits the calibrator and before the thermoplastic has had an opportunity to fully set in its final form. A further need exists for a low cost apparatus that can simply and efficiently adjust the dimension of critical features of a post-form extruded product, such as vinyl siding after it exits the calibrator.

Reference is now made in detail to the preferred embodiments of the invention, examples of which are illustrated in the accompanying drawings.

BRIEF DESCRIPTION OF THE DRAWINGS

FIG. 2 is a perspective view of a calibrator lock adjuster embodying features of the present invention in isolation;

FIG. 3 is a cross sectional view taken along line 3—3 of FIG. 1 of a calibrator lock adjuster embodying features of the present invention engaging a post-form extruded vinyl siding panel;

FIG. 4 is a cross sectional view taken along line 4—4 of FIG. 2 embodying features of the present invention including dowel holes, attachment screws, an overhanging plate, inner and outer members and a thumbscrew;

FIG. 5 is a cross sectional view taken along line 5—5 of FIG. 2 illustrating the relationship between the inner and outer members and orientation of the screw and dowel pin holes in an embodiment of the present invention.

DETAILED DESCRIPTION OF THE INVENTION

Figure 1:
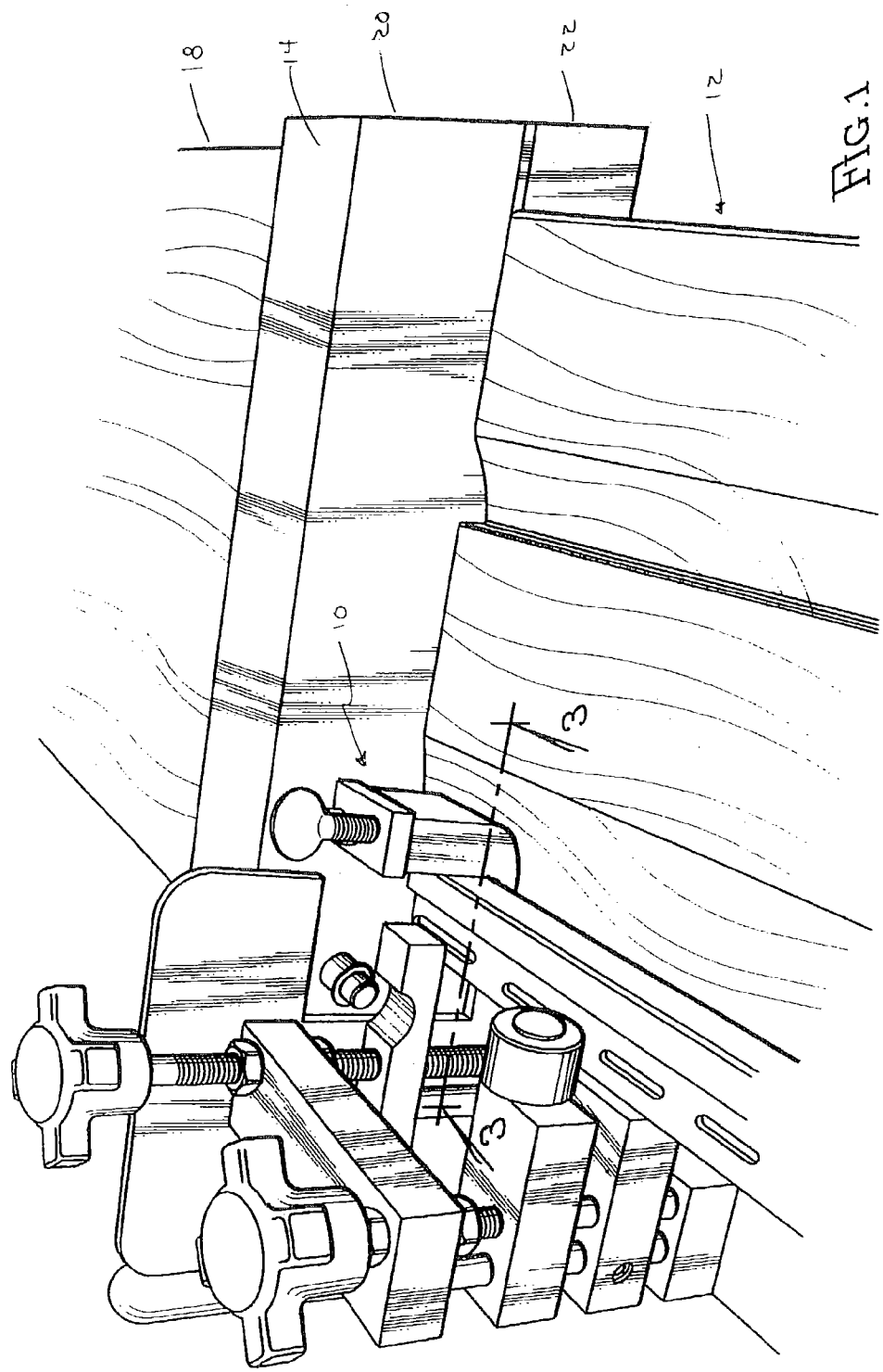
FIG. 1 is a perspective view of a calibrator lock adjuster embodying features of the present invention in its operational position connected to a calibrator in accordance with an embodiment of the present invention.

The present invention is directed to an apparatus and a method for using the apparatus to adjust the dimensions of features of a thermoplastic product that has been extruded from a fixture.

The unique adjustment device of the present invention corrects for deviations from product specification for components, such as vinyl siding, that passes through a fixture, or what is commonly referred to in the industry as a calibrator. The present invention will be discussed in the context of a company that produces a wide variety of vinyl siding styles, textures and colors. The invention, however, could be applied to a production line that produces any number of different products that may have demanding specifications for their product that could benefit from adjustment of the dimensions of the component following departure from the calibrator.

The calibrator is a precision machined fixture with typical tolerances of ±0.51 mm (0.020 inch) and generally separates into an upper and lower half that are bolted or clamped together when the extrusion line is in operation. When setting up the extrusion line for production of the vinyl siding the thermoplastic resin is heated in the extruder to about 176° C. (350° F.) through friction generated heat in the barrel of the extruder and with heater bands wrapped around the barrel.

Once the heated thermoplastic exits the barrel of the extruder it is pulled through a flat sheet die where it assumes a planar configuration and remains at a temperature of approximately 176° C. (350° F.). From the flat sheet die, the heated thermoplastic is routed to embossing rolls that provide texture and then onto cooling rolls that lower the temperature of the thermoplastic to approximately 115° C. (240° F.). The cooling rolls serve to extract heat from the thermoplastic thereby hardening the material before entry into the calibrator. The calibrator separates into an upper and lower section. When setting up the process to begin a production run of a vinyl siding product, the calibrator upper and lower sections are separated and the embossed and flattened thermoplastic sheet is laid atop the upper surface of the lower section of the calibrator. The calibrator upper section is then placed over the flat sheet and either bolted or clamped into position. The leading end of the flat sheet is then fed into the haul off machine which begins the process of pulling the extruded material though the calibrator to form the desired profile for the vinyl siding or other product.

The upper and lower internal surfaces of the calibrator are polished to a mirror finish facilitating passage of the thermoplastic flat sheet through the calibrator at speeds approaching 50 meters per minute (165 feet per minute). The calibrator also employs a series of communicating internal channels for delivery of reduced air pressure to several inlets in the upper section of the fixture. These reduced air pressure inlets within the calibrator upper section serve to pull the thermoplastic material progressing through the calibrator to the upper polished surface thereby eliminating excessive friction on the lower surface and possible jamming or clogging of the calibrator. The reduced air pressure is provided by a vacuum pump connected to lines attached to ports on the exterior surface of the upper section of the calibrator. The ports are in turn connected to the communicating channels within the calibrator.

After exiting the calibrator, the vinyl siding has been turned and shaped in the calibrator to form the desired vinyl siding profile. When the siding product exits the calibrator the temperature of the thermoplastic has dropped to approximately 38° C. (100° F.) and has lost considerable malleability. Nonetheless, there is still a very limited opportunity to redress any deviations from product specifications before the thermoplastic fully hardens.

As shown in FIGS. 1 and 3, attached to the calibrator, typically with the assistance of precision machined dowel pins is an adjustment member 10. The adjustment member has considerable utility as a final opportunity to alter the dimension of a feature of the vinyl siding product 12. As the vinyl siding 12 exits the calibrator 14 the feature 16 with the critical dimension requiring adjustment travels past the adjustment member 10 modifying the position of the feature 16 being contacted. During the set up stage when the thermoplastic flat sheet 18 is positioned between the calibrator upper section 20 and the calibrator lower section 22, the flat sheet 18 is simultaneously directed into and through the adjustment member 10 so that when production commences the profiled vinyl siding feature 16 that is being adjusted is in contact with or in very close proximity to the adjustment member contact surfaces. The contact surfaces will be discussed in more detail below.

As shown in FIGS. 4 and 5, the adjustment member 10 is comprised of an inner and outer member, the inner member 26 is slidably inserted between the two legs 30, 32 of the outer member 36. Both the inner and outer member are preferably machined from stainless steel. As depicted in FIGS. 2 and 3, the inner and outer members 26, 36 are preferably J-shaped in configuration with an upper generally planar surface 40 and lower outwardly extending fingers 42, 43, 44. The outwardly extending fingers 42, 43, 44 can be configured as necessary to introduce the desired correction to the feature being adjusted, however, as depicted in FIG. 3 the preferred embodiment for adjusting the feature 16 on vinyl siding panels is an elliptical crown 50. The elliptical crown 50 in the preferred embodiment is polished to a mirror finish in order to provide an ultra-smooth surface over which the vinyl siding panel may rapidly advance and receive dimensional correction.

As shown in FIG. 2, resting atop and detachably secured to the upper surface of the inner member is a plate overhanging at least one of the outer members. The overhanging plate 52 is secured to the inner member by screws 54 or any other suitable attachment means. As depicted in FIGS. 4 and 5, disposed through the overhanging plate 52 is a threaded hole 56 into which is threaded a thumbscrew 58 or any other suitable means for urging vertical displacement between the inner and outer members 26, 36. Preferably the thumbscrew 58 would have fine threads with a shallow pitch to enhance the control over the displacement of the inner member 26. As shown in FIG. 4, the thumbscrew 58 is threaded through the overhanging plate 52 and is placed into contact with the base 60 of an unthreaded hole 62 in the outer member. As the thumbscrew 58 is turned, the tip 64 of the thumbscrew 58 contacts the base 60 and applies a force to the base 60. Since the outer member 36 is rigidly secured to the calibrator 14, preferably by precision ground dowel pins placed into dowel pin holes 70, the force applied by the tip 64 of the thumbscrew 58 will not alter the outer member's 36 position. Instead, the application of force through the thumbscrew tip 64 against the stationary outer member 36 urges the inner member 26 to move from a first position to a second position resulting in displacement D.

The location of the second position for the inner member 26 and its associated outwardly extending finger 43 will typically be determined by calculating the difference between the dimension of the vinyl siding feature 16 as measured at the production line and subtracting that value from the product specification dimension. For example, if the gap of the locking feature 16 of the panel 12 was measured on the production line at 0.35 inches and the product specification dimension was 0.38 inches, the thumbscrew would be turned an appropriate number of turns to correspond with the difference in values, i.e., 9.7 mm–8.9 mm=0.8 mm (0.38 inches–0.35 inches=0.030 inches). When the thumbscrew 58 is rotated an amount corresponding to 0.8 mm (0.030 inches) in displacement D, the crown 50 on the finger 43 would separate the locking feature 16 by 0.8 mm (0.030 inches) as needed to satisfy product specifications.

As a second example, if the locking feature 16 gap is 9.7 mm (0.38 inches) and the product specification dictates a 9.2 mm (0.36 inches) separation, the gap is too wide by 0.5 mm (0.020 inches). In that situation, the thumb screw 58 would be turned an amount corresponding to a lesser displacement of 0.5 mm (0.020 inches) lower thereby closing the gap of the locking feature 16 by the requisite displacement. This repositioning of the thermoplastic feature is possible because the thermoplastic is still malleable at the exit point of the calibrator as it has not cooled to the set point of the material.

While the present invention has been described in connection with the preferred embodiment thereof, it will be understood many modifications will be readily apparent to those skilled in the art, and this application is intended to cover any adaptations or variations thereof. It is manifestly intended this invention be limited only by the claims and equivalents thereof.

What is claimed is:

1. An apparatus for adjusting the dimensions of extruded thermoplastic component, said apparatus comprising:

a member mounted on a fixture, the member configured for receiving the thermoplastic component exiting the fixture wherein the member is further comprised of an outer member with a first and second leg, and an inner member, the inner and outer members including an upper surface and a shaping means opposed the upper surface for adjusting the dimensions of the component exiting the fixture, the shaping means comprising a finger outwardly extending from the inner and outer members wherein the finger of the inner and outer members includes an elliptical crown for contact with the thermoplastic component, the inner member being slidably disposed between the first leg and second leg of the outer member;

means for selectively modifying the configuration of the member from a first position to a second position so that as the thermoplastic component is received by the member a dimension of the thermoplastic component is modified.

2. The apparatus according to claim 1, wherein the inner member includes an overhanging plate detachably secured to the upper surface of the inner member.

3. The apparatus according to claim 2, wherein the means for selectively modifying the configuration of the member comprises a screw in threaded engagement with the overhanging plate and in proximate contact with a substantially horizontal surface of either outer member so that upon rotation of the screw the inner member is slidably urged from the first position to the second position.

4. The apparatus according to claim 1, wherein the member is attached to the fixture with dowel pins.

* * * * *